US006895688B2

(12) United States Patent
Acharya et al.

(10) Patent No.: US 6,895,688 B2
(45) Date of Patent: May 24, 2005

(54) LIQUID CRYSTAL POLARIZATION ROTATOR AND METHOD OF USING SAME

(75) Inventors: Bharat R. Acharya, Madison, WI (US); Cheng Cher Huang, New Brighton, MN (US); Christi Kay Madsen, South Plainfield, NJ (US); John A. Rogers, Champaign, IL (US)

(73) Assignees: Lucent Technologies Inc., Murray Hill, NJ (US); The University of Minnesota, Minneapolis, MN (US)

( * ) Notice: Subject to any disclaimer, the term of this patent is extended or adjusted under 35 U.S.C. 154(b) by 0 days.

(21) Appl. No.: 10/651,689

(22) Filed: Aug. 29, 2003

(65) Prior Publication Data

US 2005/0044742 A1 Mar. 3, 2005

(51) Int. Cl.[7] .................................................. F26B 3/34
(52) U.S. Cl. ........................... 34/246; 34/250; 349/133; 349/153; 359/250; 359/281; 348/742; 348/751
(58) Field of Search ........................... 34/246, 250, 253, 34/279; 349/133, 153; 359/250, 281; 348/742, 51; 356/367, 453; 385/11, 15; 372/703, 33; 324/158.1, 244.1

(56) References Cited

U.S. PATENT DOCUMENTS

| | | | | |
|---|---|---|---|---|
| 4,340,277 A | * | 7/1982 | Kaufmann et al. | 349/33 |
| 5,659,411 A | * | 8/1997 | Nito et al. | 349/117 |
| 6,028,656 A | * | 2/2000 | Buhrer et al. | 349/196 |
| 6,219,113 B1 | * | 4/2001 | Takahara | 349/42 |
| 6,552,836 B2 | | 4/2003 | Miller | |

FOREIGN PATENT DOCUMENTS

| | | | | |
|---|---|---|---|---|
| EP | 1205467 | * | 5/2004 | C07C/69/88 |
| WO | WO 93/10477 | * | 5/1993 | 34/246 X |

OTHER PUBLICATIONS

Katsuhiko Hirabayashi et al., "Liquid–Crystal Polarization Controller Arrays on Planar Waveguide Circuits", IEEE Photonics Technology Letters, vol 14, No. 4, Apr. 2002, pp. 504–506.

(Continued)

Primary Examiner—Stephen Gravini (57) ABSTRACT

A liquid crystal polarization rotator device is able to rotate polarization fast enough to compensate polarization mode dispersion. The amount or degree of rotation is rapidly reconfigurable. The device includes a cavity filled with a nematic liquid crystal material. The cavity has electrodes on a first face, e.g., a first substrate, and electrodes on a second face, e.g., a second substrate, opposite the first face. The electrodes are shaped and positioned to produce an electric field across the cavity capable of rotating the alignment direction of the molecules of the liquid crystal material in the cavity. The electrodes are patterned on the ends of optical fibers. Aligning and positioning of the electrodes on the ends of the optical fibers with a predetermined spacing forms the cavity that is filled with the nematic liquid crystal material. The filled cavity is a so-called liquid crystal microcell wave plate. A control system is used to control the "rapid" rotation of the alignment direction of the molecules of the liquid crystal material. The control system receives data regarding the polarization of light entering or leaving the microcell and adjusts the direction of the electric field also using trigger pulses such as to rotate the nematic liquid crystal material molecules by a first predetermined number of degrees greater than a second desired number of degrees of rotation. Then, the trigger pulses for the electric field are stopped after the molecules have rotated by the second desired number of degrees. In this manner, the molecules rotate by the second desired number of degrees much faster than if a pulse had been applied with the same speed to rotate them by the second desired number of degrees in he first place.

20 Claims, 7 Drawing Sheets

OTHER PUBLICATIONS

Takafumi Chiba et al., "Polarization Stabilizer Using Liquid Crystal Rotatable Waveplates", Journal of Lightwave Technology, vol. 17, No. 5, May 1999, pp. 885–890.

I. Dupont et al., "Principle of a compact polarization mode dispersion controller using homeotropic electroclinic liquid crystal confined single mode fiber devices", Optics Communications 176 (2000) pp. 113–119.

* cited by examiner

FIG. 7

LIQUID CRYSTAL POLARIZATION ROTATOR AND METHOD OF USING SAME

STATEMENT REGARDING FEDERALLY SPONSORED RESEARCH

This invention was funded pursuant to a grant received from the National Science Foundation (Grant No. NSF/DMR-9901739). Accordingly, the Government may have rights in this invention.

FIELD OF THE INVENTION

This invention relates generally to optical polarization rotation and, more particularly, to liquid crystal devices for introducing the polarization rotation.

BACKGROUND OF THE INVENTION

It is both desirable and necessary to correct signal distortion in high-speed optical communications over optical fibers.

In an optical fiber, ultra-short pulses of light carry the signal. Initially, in each pulse, the electric field of the light follows a given direction. Then, because the optical fiber is not perfectly circular, the direction of the electric field, or polarization, splits into two components that propagate at different speeds, causing the pulse to spread, an effect referred to as polarization mode dispersion (PMD).

External fluctuations in the ambient conditions such as temperature, mechanical vibration, etc. cause the PMD to vary with time. At very high transmission rates, which can reach beyond 40 Gb/s, these time varying distortions are so severe that they need to be compensated for to achieve reliable operation of the optical signal transmission. Current optical transmission systems include, at regular intervals, PMD-compensating devices, which incorporate a device, known as a polarization controller, to control the polarization state of the optical pulses.

Presently, lithium niobate ($LiNbO_3$) based polarization controllers (PolCons) can adjust the polarization fast enough to adequately compensate for the time variations in the PMD. Unfortunately, such lithium niobate devices are very expensive.

Polarization controllers (PolCons) based on variable-birefringence nematic liquid crystal devices known in the art have finite tuning range and hence require complicated resetting algorithms. Other prior known devices based on rotatable nematic liquid crystal wave plates avoid this problem, but require large numerical aperture bulk optics for controlling and focusing the light, and they have relatively slow, millisecond switching speeds.

SUMMARY OF THE INVENTION

These and other problems and limitations of prior known polarization controllers, i.e., rotators, are overcome by employing a liquid crystal polarization rotator device that is able to rotate polarization fast enough to compensate polarization mode dispersion. The amount or degree of rotation is rapidly reconfigurable.

The device includes a cavity filled with a nematic liquid crystal material. The cavity has electrodes on a first face, e.g., a first substrate, and electrodes on a second face, e.g., a second substrate, opposite the first face. The electrodes are shaped and positioned to produce an electric field across the cavity capable of rotating the alignment direction of the molecules of the liquid crystal material in the cavity.

In a particular embodiment, the electrodes are patterned on the ends of optical fibers. Aligning and positioning of the electrodes on the ends of the optical fibers with a predetermined spacing forms the cavity that is filled with the nematic liquid crystal material. The filled cavity is a so-called liquid crystal microcell wave plate.

In another embodiment of the invention, a control system is used to control the "rapid" rotation of the alignment direction of the molecules of the liquid crystal material. To this end, the control system receives data regarding the polarization of light entering or leaving the microcell and adjusts the direction of the electric field also using trigger pulses such as to rotate the nematic liquid crystal material molecules by a first predetermined number of degrees greater than a second desired number of degrees of rotation. Then, the trigger pulses for the electric field are stopped after the molecules have rotated by the second desired number of degrees. In this manner, the molecules rotate by the second desired number of degrees much faster than if a pulse had been applied with the same speed to rotate them by the second desired number of degrees in he first place.

In still another embodiment, a polarizer is attached to one of the fibers and the electrodes are patterned on top of the polarizer. This configuration, with the cavity filled with nematic liquid crystal, acts as a polarimeter to measure the state of polarization of light.

In yet another embodiment, a cavity having a thickness needed for a half wave plate is inserted between two cavities having a thickness needed for a quarter wave plate. This configuration, with the cavity filled with nematic liquid crystal, acts as a polarization controller that can transfer any polarization state to any other polarization state.

DETAILED DESCRIPTION

Introduction

With the increasing demand for high speed data transmission in wavelength division multiplex (WDM) systems, polarization management, used for optical polarization mode dispersion (PMD) compensation or polarization de-multiplexing, has become important. In order to upgrade existing systems to higher capacity, PMD has to be dynamically compensated for on a per-channel basis in a cost-effective way. In most of the proposed optical PMD Compensators (PMDC), one or more polarization controllers (PolCons), which can transform any arbitrary input polarization state to any arbitrary output polarization state, are used to launch the signal with a certain polarization state in a birefringent medium. Liquid crystal based PolCons offer the best combination of low insertion loss and fast response time for optical transmission systems compared to other designs (e.g. fabricated in LiNbO3 or mechanically adjustable devices). Here, we disclose the design and operation of a unique, continuously rotatable, and endless PolCon using nematic liquid crystals (NLCs). An optimized electrode design and a novel pulsed driving scheme, described below, has enabled, for the first time, $\mu$s-response at low driving voltages for NLC PolCons.

NLCs are materials having molecules that show preference for alignment with their neighboring molecules even though they are in a liquid state with no long-range positional ordering. The local orientation of the NLC is described by the "director", i.e., a unit vector along the direction of the average orientation of the NLC molecules, which can be aligned by application of proper boundary conditions to achieve a macroscopic alignment. An aligned layer of NLC behaves like a uniaxial medium; when light passes through an aligned layer of NLC, a phase difference is introduced between the ordinary and extraordinary light rays.

Fabrication

Figure 1A:
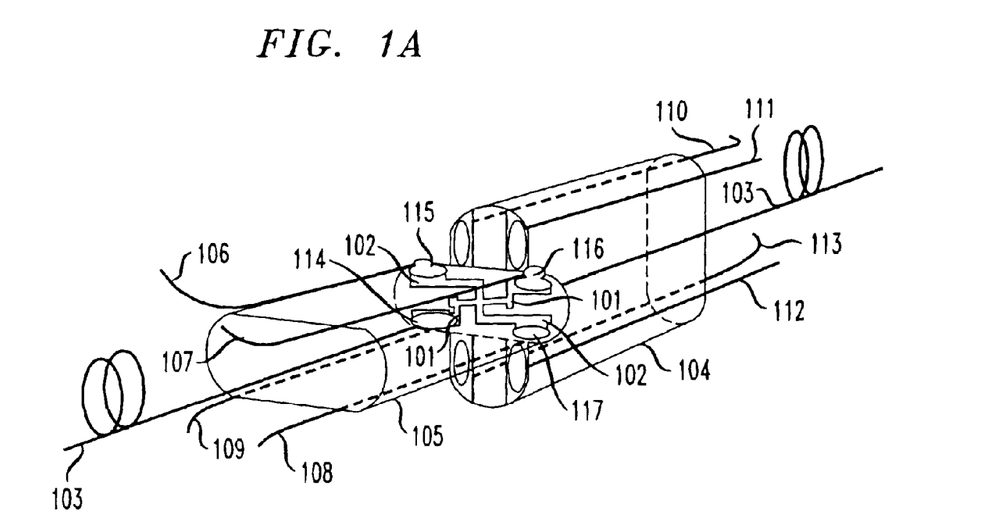
FIG. 1A is a perspective view of a fiber ferrule based microcell wave plate for used in a polarization controller, in accordance with the invention.
Figure 1B:
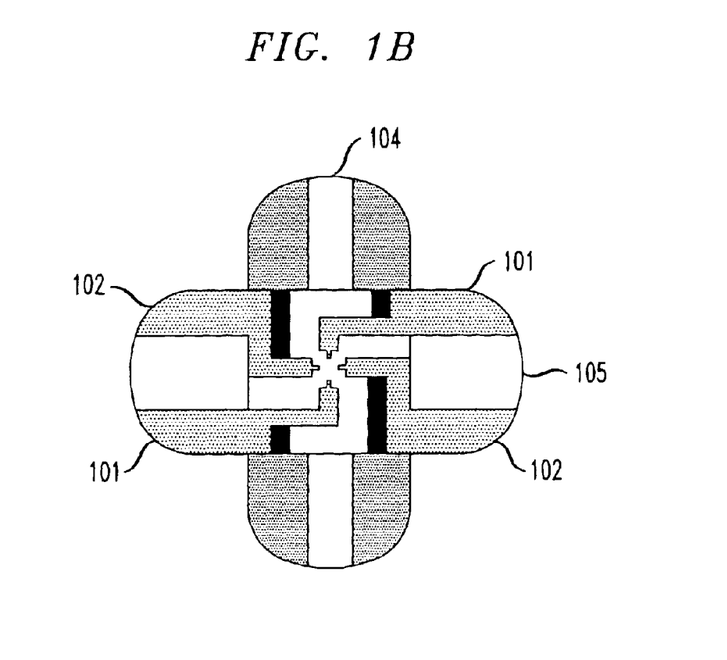
FIG. 1B is a top cross-sectional view of the wave plate of FIG. 1A.

FIG. 1A shows a perspective view of a fiber ferrule based microcell wave plate for use in a polarization controller, in accordance with the invention, and FIG. 1B shows a top cross-sectional view of the wave plate of FIG. 1A.

In the design of a continuously rotatable NLC based microcell wave plate, two pairs of gold electrodes 101 and 102 are patterned on the end facet of an optical fiber 103 mounted in a flat glass ferrule 104 such that the core of the fiber 103 lies at the center of the electrodes 101 and 102. In this example, the width of the electrodes 101 and 102 is 5 $\mu$m and spacing between the electrodes 101 and 102 is 25 $\mu$m. Two such ferrules 104 and 105 are rotated by 90° relative to each other, and facing each other, as shown in FIG. 1A, were actively aligned with a predetermined gap between them (in this example, 4 $\mu$m for a quarter wave plate and 8 $\mu$m for a half wave plate). The gap between electrodes 101 and the gap between electrodes 102 are more clearly shown in FIG. 1B. In this example, the over-all size of a wave plate including the mounts is 2.5 cm×0.5 cm×0.25 cm and can further be reduced. The gap between these ferrules, forming a cavity, was filled with NLC by capillary action. The corresponding electrodes on both ferrules were connected together (by connecting the electrical connectors 106 and 110, 117 and 111, 109 and 113, and 108 and 112), which is the typical situation, and electric potentials $V_k(\phi)=V_0$ Cos $(k*90+\phi)$, $k\in\{1,\ldots,4\}$ were then applied to the $k^{th}$ electrode. In this example, $V_0$ is a 10 kHz square wave potential. This allows control of the azimuthal orientation ($\phi$) of the NLC optic axis in the plane of the ferrule facets 104 and 105 by controlling the potential applied to the two sets of electrodes each including electrodes 101 and 102. With this geometry, it was also possible to position the electrodes 101 and 102 significantly closer to the fiber core providing a stronger uniform field over the optically active area and, hence, high speed operation at a relatively low operating voltage (<100 Vp).

The top cross-sectional view of the wave plate of FIG. 1A is shown in FIG. 1B.

Figure 2A:
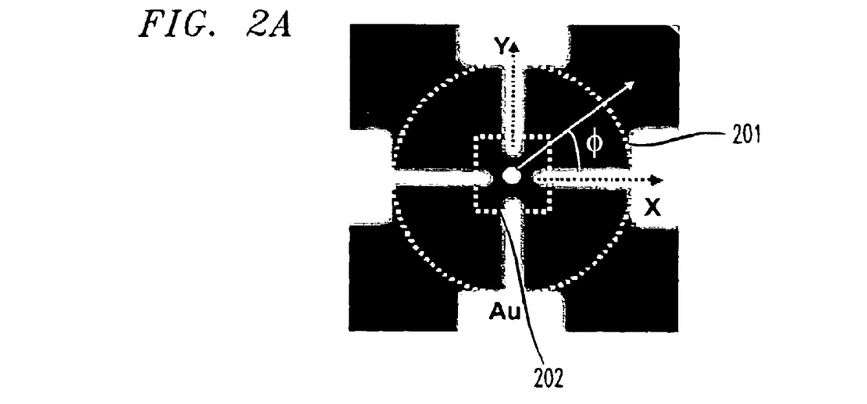
FIG. 2A shows an electrode structure fabricated on the tip of an optical fiber at the end of a ferrule.

FIG. 2A shows an electrode structure fabricated on the tip of an optical fiber at the end of a ferrule, e.g., 104. The circle 201 represents the perimeter of, in this example, a 125 $\mu$m single mode optical fiber and the dot at the center is the fiber core. The square 202 at the center depicts the base of a 4 $\mu$m thick box used to calculate an in-phase component of the electric field E in the mid-plane between two substrates for $\phi=0°$.

Figure 2B:
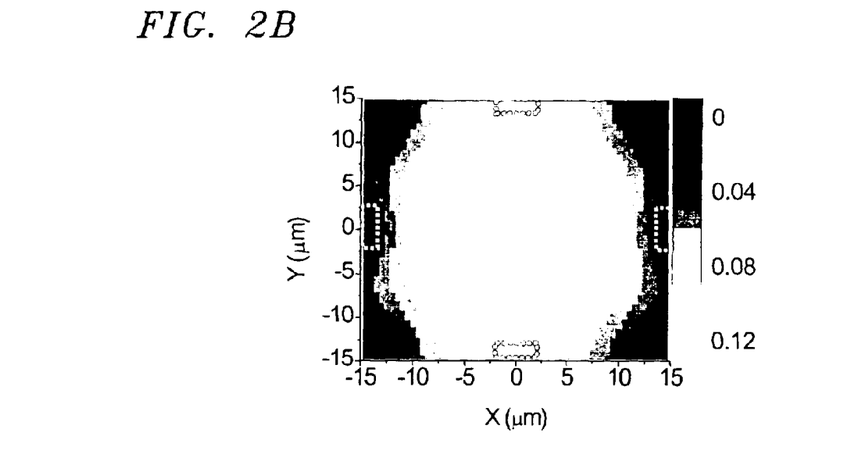
FIG. 2B illustrates the magnitude of the in-plane component of the electric field in the mid-plane between the planes of the two sets of electrodes.

FIG. 2B illustrates the magnitude of the in-plane component of the electric field in the mid-plane between the planes of the two sets of electrodes.

Figure 2C:
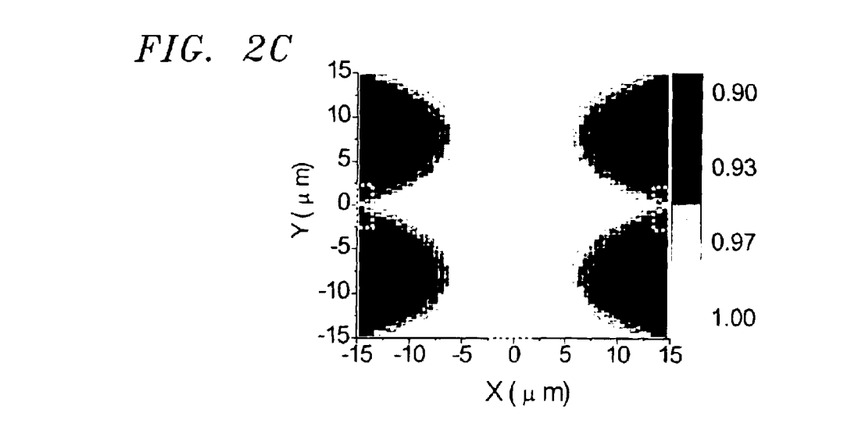
FIG. 2C illustrates a cosine-squared version of the angular deviation of the field of FIG. 2B.

FIG. 2C illustrates a cosine squared version of the angular deviation of the field of FIG. 2B. The dotted lines represent the location of the electrodes on the plane of the electrodes. These results indicate that the electric field is uniform in both magnitude and direction over the "active area" through which light propagates.

Figure 3A:
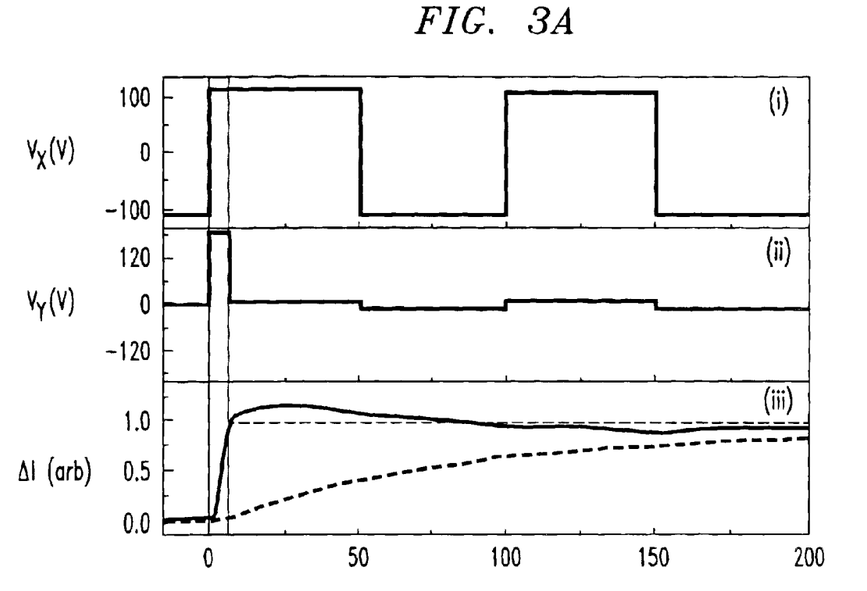
FIG. 3A (i) and (ii) show potentials applied to the electrodes of the horizontally aligned electrodes (x-electrodes in FIG. 2A) and the vertically aligned electrodes (y-electrodes in FIG. 2A), respectively, of the wave plate of FIG. 1, and (iii) shows the change in optical intensity at a photo detector when the director rotates through five degrees with (solid outline) and without (dashed outline) a triggering pulse.

FIG. 3A (i) and (ii) show potentials applied to the electrodes of the horizontally aligned electrodes (x-electrodes in FIG. 2A) and the vertically aligned electrodes (y-electrodes in FIG. 2A), respectively, of the wave plate of FIG. 1, and (iii) shows the change in optical intensity at a photo detector (FIG. 6) when the director rotates through five degrees with (solid outline) and without (dashed outline) a triggering pulse. In this example, $V_0=100$ $V_p$, and the triggering pulse is $V_t=200$ $V_p$ directed at an angle of 60°.

Figure 3B:
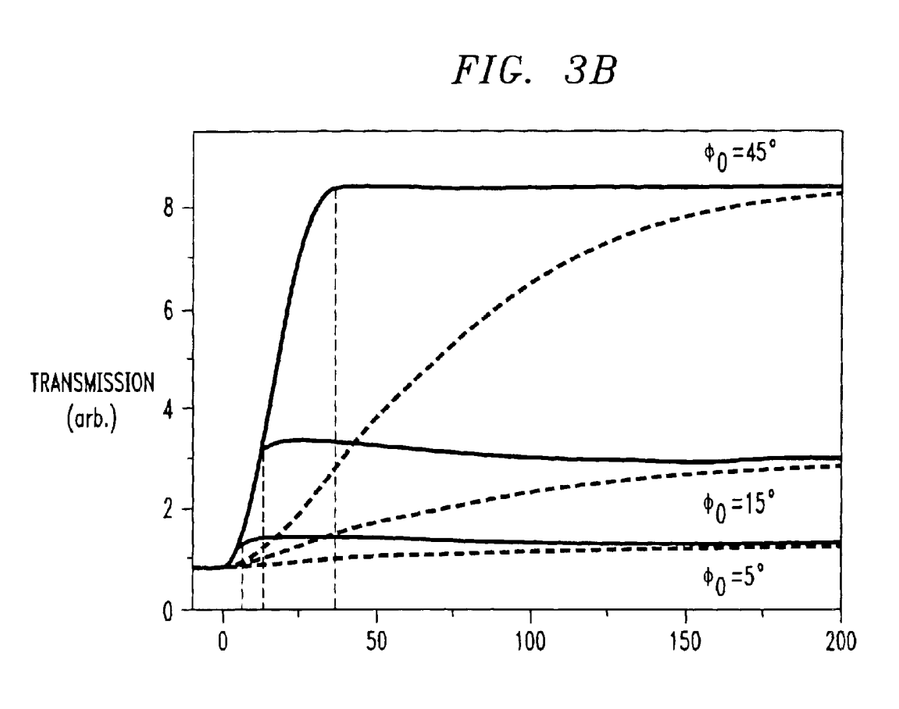
FIG. 3B illustrates switching characteristics for an optical fiber ferrule based nematic liquid crystal quarter wave plate of FIG. 1A for a number of angular orientations with (solid outline) and without (dashed outline) a triggering pulse.

FIG. 3B illustrates switching characteristics for an optical fiber ferrule based nematic liquid crystal quarter wave plate of FIG. 1A for a number of angular orientations with and without a triggering pulse oriented at 60°.

When the applied electric field in the cavity, i.e., gap between the faces of ferrules 104 and 105, is greater than a threshold value, the Frederiks transition occurs from the random planar to uniform planar orientation. At a sufficiently high electric field almost all the NLC molecules are aligned parallel to the electric field and the small misalignment at the liquid crystal-glass interface has little effect. The in-plane orientation of the nematic director can then be adjusted by controlling the direction of the electric field, i.e., by adjusting the potentials $V_k$. When switched from one azimuthal orientation to another, the dynamic response of the NLC director is determined by the torques associated with viscosity, elasticity, and external field, it is also affected by the inertia of the NLC and surface effects. For simplicity, the standard assumption, that the contribution from the surface, elasticity, and inertial effects are negligible in comparison to that from viscosity, was applied. Thus, when an external field E is applied along the direction $\phi_0$, the Erickson-Leslie equation describing the dynamic behavior of the NLC director becomes:

$$\gamma_1 \frac{d\phi(t)}{dt} = \frac{1}{2}\Delta\varepsilon E^2 \sin2[\phi_0 - \phi(t)], \qquad (1)$$

where, $\gamma_1$ and $\Delta\varepsilon$ are the rotational viscosity and the dielectric anisotropy of the NLC material, respectively. The solution of Equation 1 is given by $$\phi(t)=\phi_0-\tan^{-1}[\tan(\phi_0-\alpha)e^{-t/\tau}] \qquad (2)$$

with $\tau=\gamma_1/\Delta\varepsilon E^2$ the characteristic response time of the NLC and $\alpha$ the initial azimuthal orientation of the director.

The rotational speed of the director is determined by the interplay between the viscous torque and electric torque. For given electric field strength and material parameters, it depends on the orientation of the field relative to the initial orientation of the director. Compared with small angular rotations, the maximum rotational speed is higher for rotations through large angles, since the electric torque is also higher at larger angles. It is noted that the angular speed of the director is not constant; the maximum speed is higher if the electric field is directed at a larger angle with respect to the initial director orientation. Thus, the director can be rotated faster through an angle $\phi$, if the initial torque is applied to the director as if it were to be rotated through $\phi_0(>\phi)$. As soon as it rotates through $\phi$, the external field is then switched to the value required to hold the director at $\phi$. This effect can be exploited to improve the switching speed significantly if the device under consideration requires reorientation of the director through small angles, which is an essential capability for many important applications in optical communications. If a triggering pulse of strength E is applied for time $t_1$ along the direction $\phi_p$ and then a holding field of the same strength is applied along $\phi_0$ at $t_1$, the solution to Equation (1) for $t<t_1$ is given by Equation (2) with $\phi_0$ replaced by $\phi_p$. For $t>t_1$, it is given by $$\phi(t)=\phi_0-\tan^{-1}(\tan\{\phi_0-\phi_p+\tan^{-1}[\tan(\phi_p-\alpha)e^{-t1/\tau}]\}e^{-(t-t1)/\tau}) \qquad (3)$$

The optical transmission of the cell between two polarizers whose transmission axes are crossed with each other is given by $$T(t) = \frac{1}{2}\sin^2(\delta/2) \times \sin^2 2\phi(t),$$

where $\delta$ is the optical retardation of the NLC microcell.

For a given NLC, the maximum speed with the pulsed driving scheme will be limited ultimately by dielectric breakdown and possible electrochemical instability of the NLC itself. Breakdown can be avoided to a certain extent by specialized electrode designs. Further increases in speed are possible by choosing materials and operating conditions that maximize $\Delta\varepsilon/\gamma_1$. In general, the ratio $\gamma_1/\Delta\varepsilon$ attains the smallest value at a temperature about 20° C. below the nematic-isotropic transition temperature.

To exploit this property of liquid crystals for improving the response time, a NLC, MLC-14200-000 (Merck Chemicals), was chosen having a large optical birefringence, high dielectric anisotropy, and relatively low viscosity ($\Delta n=0.1292$ at $\lambda=589.3$ nm, $\Delta\varepsilon=29.3$, and $\gamma_1=297$ mPas at 20° C.). The nematic-isotropic transition temperature of this material is ~95° C., which allowed us to raise the operating temperature to ~75° C., thereby reducing the operating voltage.

Bringing the electrodes closer reduces the operating voltage significantly, at the expense of reducing the area of the uniform electric field, which, in turn, requires high numerical aperture bulk optics for collimating/focusing of light. Nevertheless, small electrode spacing can be used effectively in wave guiding devices that require a uniform electric field over a small "active area," such as in optical fibers, tapered optical fibers, or planar waveguides, where light is confined to ~2–10 µm diameter. In these cases, the electrodes can be brought close to each other, while still maintaining a uniform electric field over the active area. This approach reduces the required voltage to easily accessible ranges, and it yields a compact device that does not require any additional bulk optics.

All these above mentioned approaches have been exploited to achieve fast rotational speeds that are independent of reorientation angle over a wide range. As indicated above, FIG. 3B shows the switching characteristics of the NLC cell for different angles of rotation, with and without a triggering pulse with amplitude $V_t=200$ $V_p$ along 60°, was applied across the sets of electrodes. As soon as the optical transmissions attained a value corresponding to the necessary angular rotation of the director, the triggering pulses were turned off, and an electric field needed to hold the transmission at the corresponding value was applied thereafter. The amplitude of the holding potential was $V_0=100$ $V_p$. Clearly, compared to the conventional driving scheme, the switching time improves significantly when an initial triggering pulse is applied, especially for small angles. Moreover, the NLC director follows the trajectory generated by the triggering pulse in a predictable fashion for all angles. This behavior simplifies the design of the driving electronics. By raising the operating temperature to 75° C. the operating voltages can be reduced to 100 $V_p$.

Figure 4:
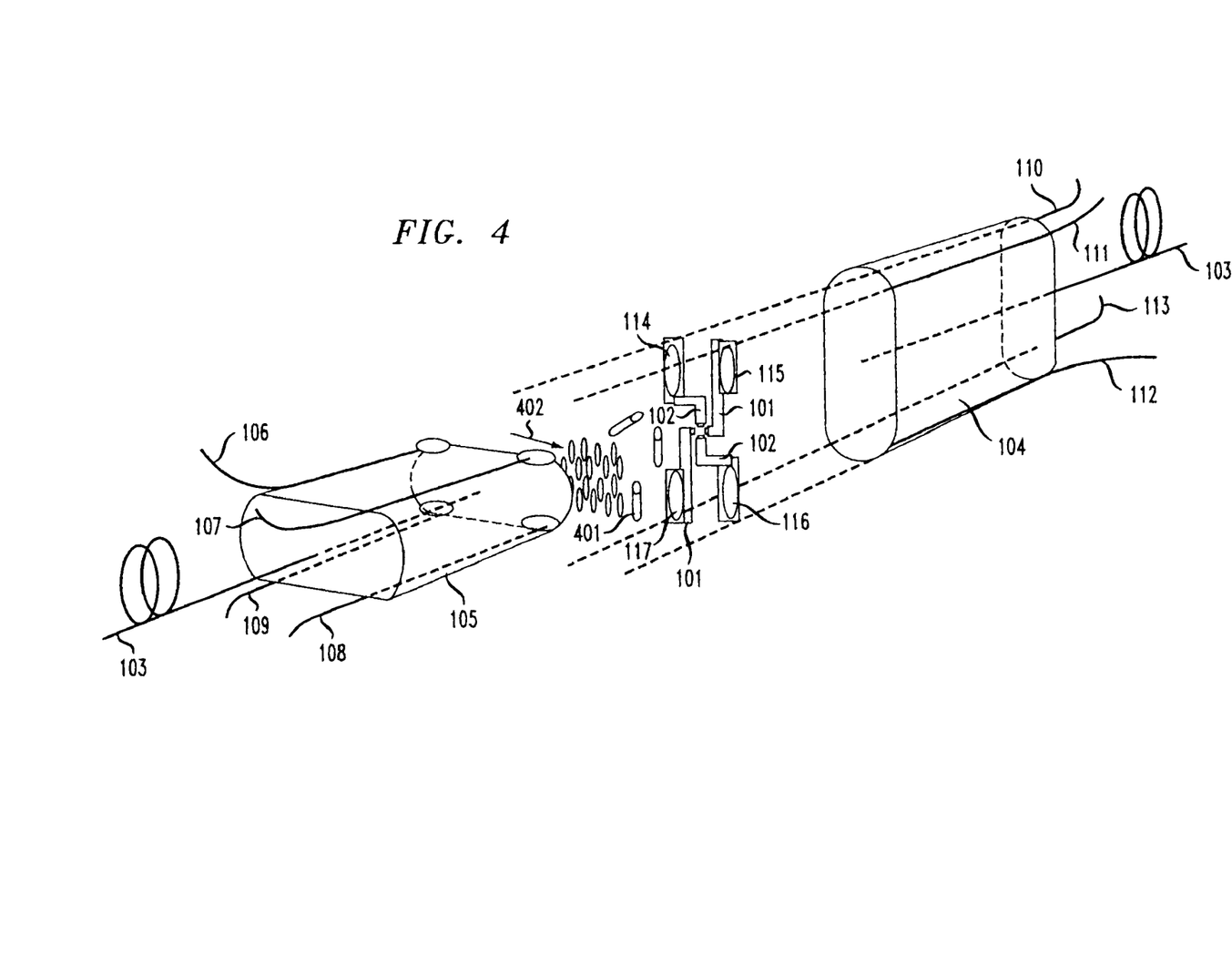
FIG. 4 shows a perspective view further illustrating the structure of the wave plate of FIG. 1A.

FIG. 4 shows an exploded perspective view further illustrating the structure of the wave plate of FIG. 1A. Elements that are the same in structure and operation as those shown in FIG. 1A have been similarly numbered and will not be discussed in detail. Thus, shown is an exploded perspective of the wave plate including ferrules 104 and 105. Also shown here are spacers 401 that are employed to define the space between the facets of ferrules 104 and 105 and, hence the thickness of the cavity form when ferrules 104 and 105 are positions together to form the wave plate. Also shown is the nematic liquid crystal material 402 that is inserted by capillary action into the cavity formed by the ends of the ferrules 104 and 105 being spaced apart via spacers 401 which are 4 µm thick for a quarter wave plate and 8 µm thick for a half wave plate. A combination of a half wave plate between two-quarter wave plates in series constitutes a full polarization controller that can transform any arbitrary input polarization state to any output polarization state.

Figure 7:
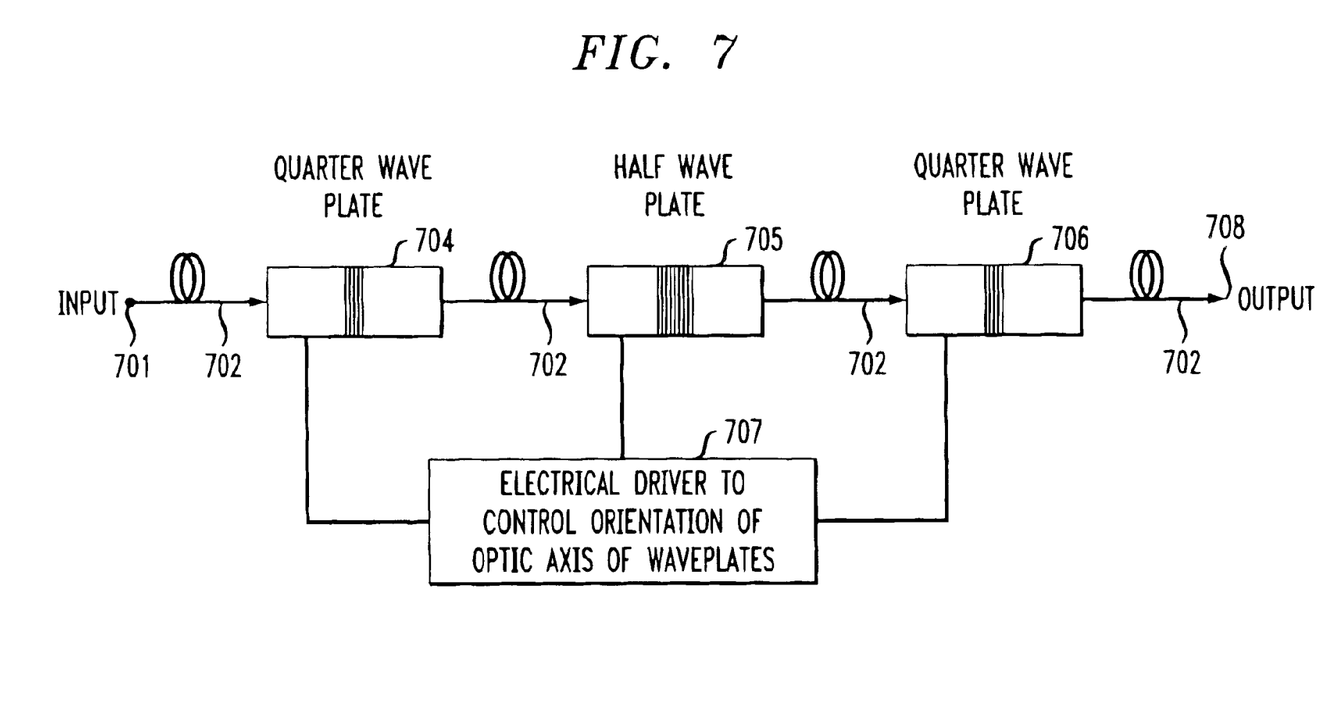
FIG. 7 shows in simplified form one example of a polarization controller.

One such polarization controller, i.e., rotator, is shown in simplified form in FIG. 7. Specifically, shown are input 701 for supplying an optical signal to optical fiber 702, a first quarter wave plate 704, a half wave plate 705 and a second quarter wave plate 706, electric drivers unit 707 and output 708, which yields an optical signal having the desired output polarization rotation, i.e., state. Electric drivers unit 707 controls the orientation of the optical axis of each of wave plates 704, 705 and 706 to yield at output 708 the desired polarization rotation of the input optical signal supplied to input 701. Each of wave plates 704, 705 and 706 is implemented in accordance with the principles of the invention as described above.

Figures 5A, 5B:
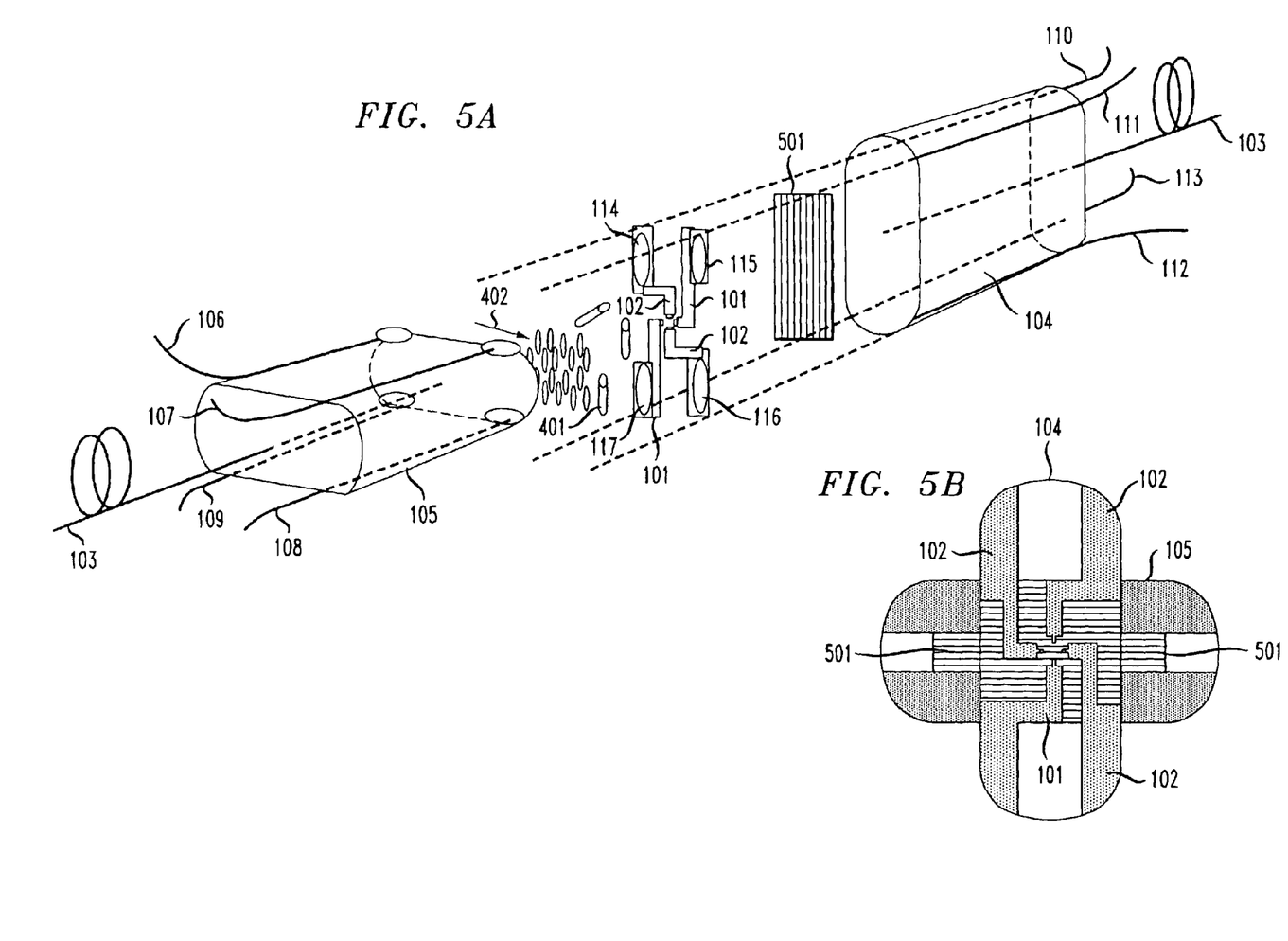
FIG. 5A is a perspective view illustrating the structure of FIG. 4 including a polarizer to form a polarimeter.
FIG. 5B is a top cross-sectional view of the wave plate of FIG. 5A.

FIG. 5A is an exploded perspective view illustrating the structure of FIG. 4 including a polarizer 501 to form a polarimeter that determines the state of polarization of light. Again, elements that are the same in structure and operation as those shown in FIGS. 1A and 4 have been similarly numbered and will not be discussed in detail. The only difference between the embodiments of FIGS. 1A and 4 is the addition of polarizer 501. In this example, polarizer 501 is an ~30 µm thick Polarcor Ultrathin (Corning, Inc.) polarizer that is glued onto the tip of optical fiber 103 that is mounted in ferrule 104. In this example, the pairs of electrodes 101 and 102 are ~0.2 µm thick, ~5 µm wide and separated by ~25 µm, and the gap between the faces of ferrules 104 and 105 is ~4 µm.

FIG. 5B is a top cross-sectional view of the wave plate of FIG. 5A

Figure 6:
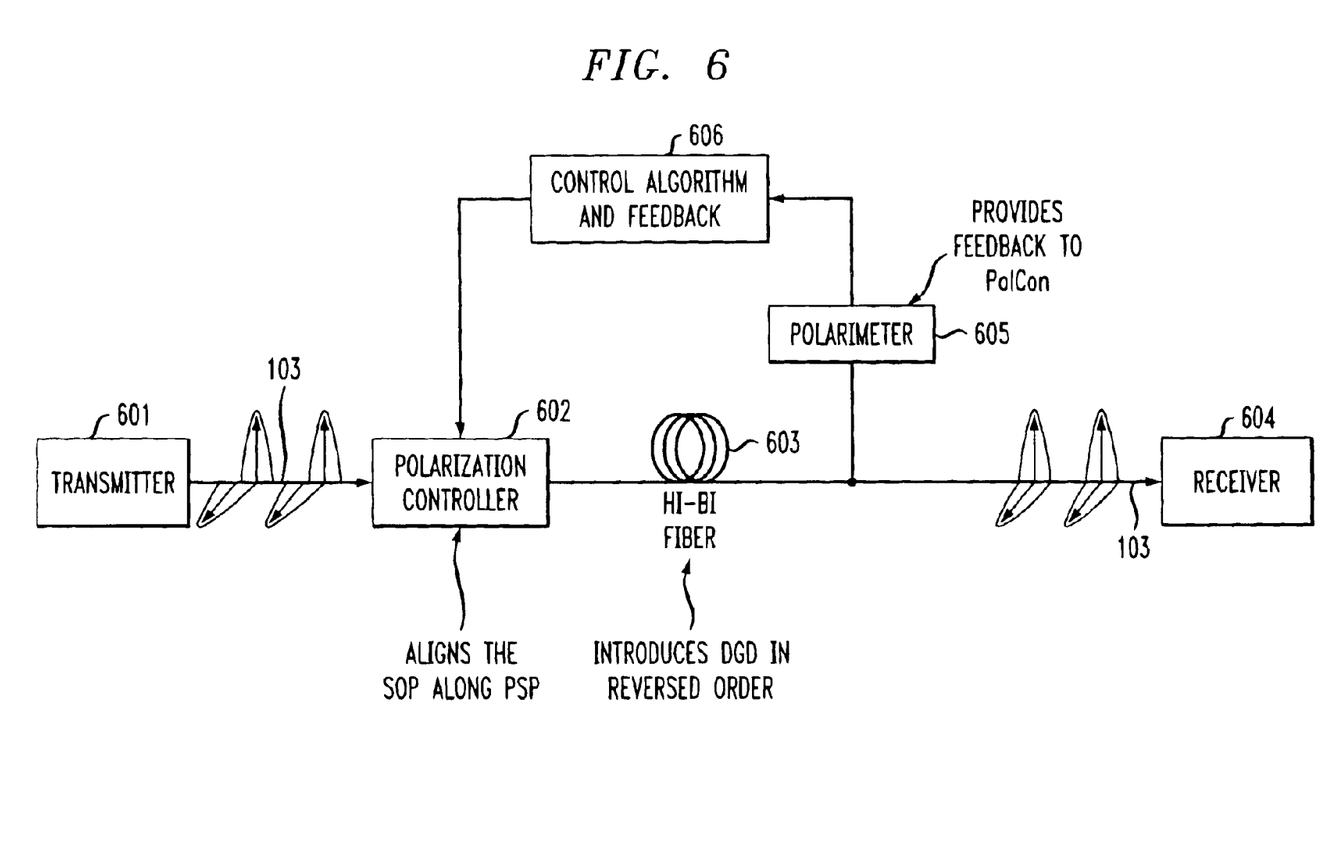
FIG. 6 shows in simplified form an optical fiber transmission link including in this example a polarimeter, polarization controller and control processor, in accordance with an embodiment of the invention.

FIG. 6 shows in simplified form an optical fiber transmission link including, in this example, a polarimeter 605, polarization controller 602, optically birefringent fiber 603 and control processor 606, in accordance with an embodiment of the invention. Thus, shown, are transmitter 601, which is a data source, polarimeter 605, under control of control processor 606 measure the state of polarization (SOP) and provide feedback to polarization controller 602 (FIG. 1A, FIG. 4) which rotates the polarization to the desired state, the birefringent fiber 603, which compresses the pulse and the receiver 604. These elements operate, as defined above, to compensate the PMD in data carried by the optical wave propagating through fiber 103.

The above-described methods and apparatus are, of course, merely illustrative of the principles of the invention. Indeed, numerous other methods or apparatus may be devised by those skilled in the art without departing from the spirit and scope of the invention. For example, the NLC microcell of this invention may find use in electro-optical devices such as polarization multiplexers, modulators, attenuators, switches, filters or the like.

What is claimed is:

1. An apparatus, comprising:
   a wave plate having oppositely positioned first and second faces forming a cavity;
   a nematic liquid crystal material being disposed between said oppositely positioned cavity faces; and
   a first plurality of electrodes located relative to at least said first face of said cavity,
   wherein said first plurality of electrodes is configured to apply an electric field having a first component parallel to said first face, said first plurality of electrodes being able to rotate an orientation of said first electric field component and, hence, molecules of said liquid crystal material, by a plurality of angles.

2. The apparatus of claim 1, further comprising a first segment of an optical fiber being configured and positioned to transmit light to said wave plate through one of said faces and receive light from said wave plate from said one of said faces.

3. The apparatus of claim 2, wherein said first electrodes are configured and positioned on a front cross-sectional surface of said first optical fiber segment.

4. The apparatus of claim 1, further comprising,
   a second plurality of electrodes located relative to said second face of said cavity,
   wherein said second plurality of electrodes is configured to apply an electric field having a second component parallel to said second face, said second plurality of electrodes being able to rotate an orientation of said second electric field component and, hence, molecules of said liquid crystal material, by a plurality of angles.

5. The apparatus of claim 4, further comprising a first segment of an optical fiber being configured and positioned to transmit light to said wave plate through said first face and receive light from said wave plate from said first face and a second segment of an optical fiber being configured and positioned to transmit light to said wave plate through said second face and receive light from said wave plate from said second face.

6. The apparatus of claim 5, wherein said first electrodes are configured and positioned on a front cross-sectional surface of said first optical fiber segment and said second electrodes are configured and positioned on a front cross-sectional surface of said second optical fiber segment.

7. The apparatus of claim 1, further comprising a control system responsive to a state of polarization of light entering or leaving said wave plate to adjust said first electric field component such as to rotate a state of polarization of light to a target state.

8. The apparatus of claim 7, wherein said electric field is adjusted such as to cause said rotation of said molecules toward overshooting said target state.

9. The apparatus of claim 8, wherein said control system includes a generator of trigger pulses also applied to said first electrodes to increase said first electric field component such as to cause more rapid rotation of said molecules to said target direction.

10. The apparatus of claim 9, wherein said adjusted first electric field component is such as to cause the rotation of said state of polarization of said molecules by a prescribed rotation greater than said target state.

11. An apparatus, comprising:
    first and second segments of an optical fiber;
    at last one wave plate having oppositely positioned first and second faces forming a cavity, said first optical fiber segment having a front face adjacent to a central region of said first cavity face, and said second optical fiber segment having a front face adjacent to a central region of said second cavity face;
    a nematic liquid crystal material being disposed between said oppositely positioned cavity faces; and
    a first plurality of electrodes located relative to at least said first face of said cavity,
    wherein said first plurality of electrodes is configured to apply an electric field parallel to said first face, said first plurality of electrodes being able to rotate an orientation of said electric field and, hence, molecules of said liquid crystal material, by a plurality of angles.

12. The apparatus of claim 11, further comprising:
    a second plurality of electrodes located relative to said second face of said cavity,
    wherein said second plurality of electrodes is configured to apply an electric field parallel to said second face, said second plurality of electrodes being able to rotate an orientation of said electric field and, hence, molecules of said liquid crystal material, by a plurality of angles.

13. The apparatus of claim 12 wherein said wave plate cavity has a first predetermined thickness to form a quarter wave plate and said wave plate cavity has a second predetermined thickness to form a half wave plate, a first quarter wave plate being connected in series by an optical fiber to said half wave plate, said half wave plate being connected in series by an optical fiber to a second quarter wave plate, an input optical fiber connected to an input of said first quarter wave plate, an output optical fiber being connected to an output of said second quarter wave plate, and an electric driver unit to control the orientation of the optical axis of each of said first quarter wave plate said half wave plate and said second quarter wave plate to yield at said output optical fiber a desired polarization rotation of the input optical signal supplied to said input optical fiber.

14. The apparatus of claim 12, wherein said first electrodes are configured and positioned on a front cross-sectional surface of said first optical fiber segment and said second electrodes are configured and positioned on a front cross-sectional surface of said second optical fiber segment.

15. The apparatus of claim 14, further including a polarizer disposed between said first electrodes and said front surface of said first optical fiber segment, wherein said apparatus is capable of measuring a state of polarization of light entering said wave plate.

16. The apparatus of claim 14, further comprising a control system responsive to a state of polarization of light entering or leaving said wave plate to adjust said first electric field component such as to rotate a state of polarization of light to a target state.

17. The apparatus of claim 16, wherein said first electrodes and said second electrodes are connected in a predetermined relationship with each other, and said first and second electric field components are adjusted such as to cause said rotation of said state of polarization of said molecules toward overshooting said target direction.

18. The apparatus of claim 17, wherein said control system includes a generator of trigger pulses also applied to said first and second electrodes to increase said electric field such as to cause more rapid rotation of said molecules to said target state, wherein said adjusted electric field is such as to cause the rotation of said state of polarization of said molecules by a prescribed rotation greater than said target state.

19. A method for use in an apparatus for controllably rotating a state of polarization including,
   first and second segments of an optical fiber,
   a wave plate having oppositely positioned first and second faces forming a cavity said first optical fiber segment having a front face adjacent to a central region of said first cavity face, and said second optical fiber segment having a front face adjacent to a central region of said second cavity face,
   a nematic liquid crystal material being disposed between said oppositely positioned cavity faces, and
   a first plurality of electrodes located relative to at least said first face of said cavity,
   wherein said first plurality of electrodes is configured to apply an electric field having a first component parallel to said first face;
the method comprising:
generating an electric potential;
applying said electric potential to said first plurality of electrodes to generate an electric field parallel to said first face, said first plurality of electrodes being able to rotate an orientation of said electric field and, hence, molecules of said liquid crystal material, by a plurality of angles.

20. The method of claim 19, wherein said apparatus further includes,
   a second plurality of electrodes located relative to said second face of said cavity,
   wherein said second plurality of electrodes is configured to apply an electric field parallel to said second face, said second plurality of electrodes being able to rotate an orientation of said electric field and, hence, molecules of said liquid crystal material, by said plurality of angles,
   said first electrodes are configured and positioned on a front cross-sectional surface of said first optical fiber segment and said second electrodes are configured and positioned on a front cross-sectional surface of said second optical fiber segment,
the method further comprising,
in response to a representation of a state of polarization of light entering or leaving said wave plate, adjusting an orientation of said molecules in a quarter wave plate forms by said cavity having a first predetermined thickness, in a half wave plate formed by said cavity having a second predetermined thickness and being in series with said first quarter wave plate, in a second quarter wave plate being in series with said half wave plate, such as to rotate a state of polarization of light to said target state, and
generating trigger pulses also employed to adjust said electric field such as to more rapidly rotate said molecules toward overshooting said target state and, hence, the state of polarization of said light.

* * * * *